FIG. I

INVENTOR
ARTHUR S. CORNFORD
BY Smart & Biggar
ATTORNEYS.

June 30, 1970   A. S. CORNFORD   3,517,566
DUAL PINION DRIVE

Filed Feb. 29, 1968   4 Sheets-Sheet 2

INVENTOR
ARTHUR S. CORNFORD
BY Smart & Biggar
ATTORNEYS

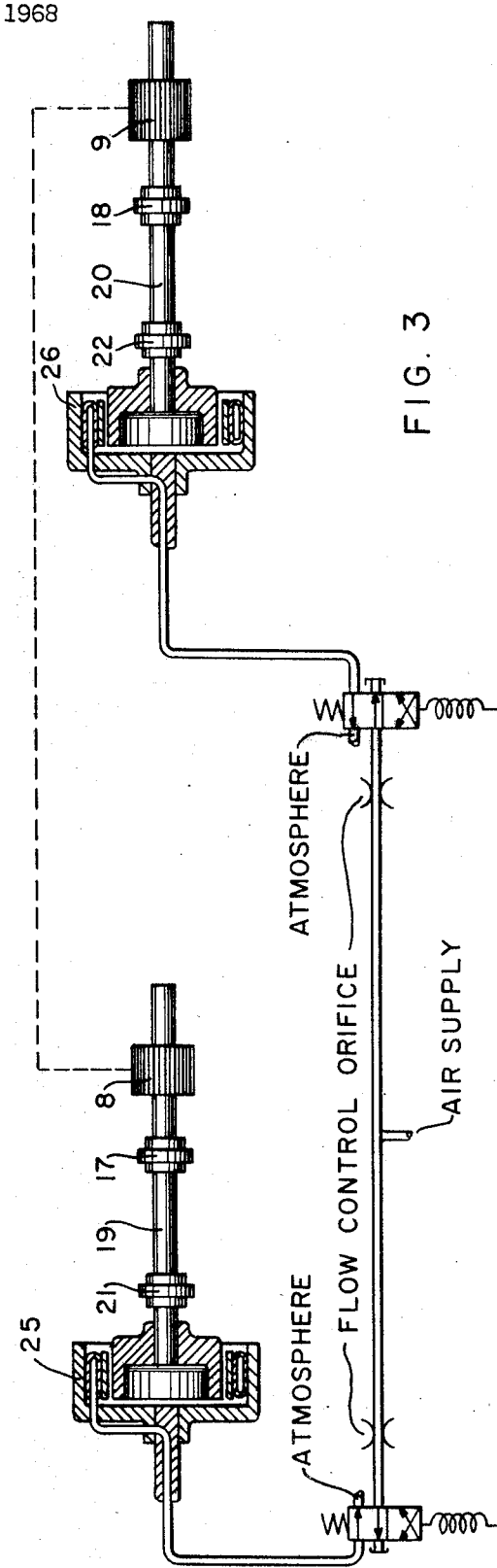

INVENTOR
ARTHUR S. CORNFORD
BY *Smart & Biggar*
ATTORNEYS

United States Patent Office 3,517,566
Patented June 30, 1970

3,517,566
DUAL PINION DRIVE
Arthur S. Cornford, Toronto, Ontario, Canada, assignor to Aerofall Mills Limited, Toronto, Ontario, Canada
Filed Feb. 29, 1968, Ser. No. 709,299
Claims priority, application Canada, Mar. 21, 1967, 985,833
Int. Cl. F16h 57/00; H02k 7/10
U.S. Cl. 74—411                                            10 Claims

ABSTRACT OF THE DISCLOSURE

A dual pinion drive system for driving large diameter gear wheels which is capable of maintaining the rotors of two electric driving motors in their correct electrical angular relationship one to the other. A drive transmitting element is provided between each pinion and its associated motor and is yieldable in operation to limit fluctuations of power drawn from each of the motors to a predetermined percentage of the normal power output of each motor.

BACKGROUND OF THE INVENTION

This invention relates to drive systems comprising two electrical motors interconnected by means tending to alter the angular relationship of the rotors of said motors during operation.

In drives, such as those used in conjunction with grinding mills, it is common to utilize a large diameter wheel or "bull" wheel mounted on the mill and driven by a pinion gear which in turn is driven by a low speed motor, or indirectly, by a high speed motor having a speed reducing gear box. These drives commonly transmit thousands of horsepower to the final gear wheel, necessitating very large face widths on the pinion and "bull" wheel. Due to increased processing demands, it is necessary for a larger amount of power to be used than can normally be handled by a single gear and pinion drive. To meet this need, the final large gear wheel may be driven by two pinions rather than one, thus imparting a considerably greater power input to the large gear wheel. However, the use of the two pinion drive in place of the single pinion drive operates satisfactorily only where both pinions transmit substantially the same amount of power continuously.

Where synchronous motors are used in connection with the dual pinion drive, and the two motors are attached to the same electrical power source, each motor rotor will have at any instant, a certain angular relationship to the other, and, as the rotors rotate, this same angular relationship will be maintained within close limits, the angular relationship being determined by the poles of the motors. If, in the two pinion drive described, above the angular position of the rotors as determined by the gear train does not coincide with the electrical angular position determined by the position of the motor poles, then the load will be unequally shared between the motors. This condition may render this particular type of drive train inoperable.

To overcome this difficulty, it is therefore necessary to provide means for ensuring that when both pinions are in firm driving contact on the driving surfaces of their teeth with the mating surfaces of the teeth of the large gear wheel, the two motor rotors are in the correct electrical angular relationship, one to the other. Unfortunately, in the manufacture of large diameter gear wheels, it is impossible to avoid certain errors in the spacing of the gear teeth as measured along the pitch line of the gear from one load bearing tooth surface to the next. This error tends to be cumulative over the large gear wheel's circumference so that, over a large arc of the cicumference, the cumulative error may become appreciable.

The effect of this gear error (the maximum extend of which can be predicted from standard manufacturing tolerances) in the case of a single pinion drive from a synchronous motor, is a variation of the angular velocity of the large gear in cycles corresponding to the rotational speed of the large gear, with an accompanying cyclic change in the power transmitted through the gear train. Where a two pinion drive is used, there is a high probability that at any one instant, one pinion may be transmitting its peak amount of power while the other is experiencing a light load. This effect is greatly increased by the characteristics of the synchronous motors with regard to instantaneous angular position. In these circumstances, the cyclic differences in power draft on the two pinions may be of such magnitude as to nullify all the advantages of the two pinion drive, with regard to practical gear design, and, furthermore, require motors of such large horsepower as to render capital expenditure excessively high. Also, manufacturers of large synchronous motors impose limitations on the cyclic power changes to be carried by such motors, a typical value being ten percent of the average power transmitted by one motor. Therefore, the problem is to devise a means of limiting the cyclic fluctuations of power draft of two motors interconnected through a gear train as described above (or through other means tending to alter the relative angular relationship of the rotors).

SUMMARY OF THE INVENTION

According to the present invention, I have solved these problems by providing in a drive system having two electrical motors interconnected by means tending to alter the angular relationship of the rotors of said motors during operation, the improvement comprising drive-transmitting elements connected to the output shafts of said motors and having a predetermined degree of elasticity so as to be yieldable in operation to limit fluctuations of power drawn from said motors to a predetermined percentage of the normal power output of said motors.

In an embodiment of my invention, the drive-transmitting elements having a predetermined degree of elasticity are in the form of identical connecting shafts intermediate each motor and pinion. These connecting shafts, which will be hereinafter referred to as torsion shafts, may be considered for the purposes of this discussion as the only elastic elements in the drive trains, the pinion and gear teeth, the pinion shaft, the motor shaft and any connecting shafts being considered inelastic.

Assuming the maximum allowed variation in transmitted power from a synchronous motor is ten percent of the average value of power transmitted by each pinion, whether or not the input to the torsion shaft is delivered from an output shaft of a low speed synchronous motor or from the output shaft of a speed reducer driven by a higher speed motor, and assuming the speed of the torsion shaft input is constant, the torsional moment applied to the shaft is directly proportional to the power transmitted by the shaft. As a torsion shaft diameter is selected which is considered satisfactory for transmission of the average torque whilst providing a suitable factor of safety, it follows that, for any fixed torque value, the angular deflection of the shaft under load will be directly proportional to the length of the shaft.

From the gear specifications, the maximum pitch error, which may be positive or negative in value, may be determined over the arc between the points of contact of the two pinions. If this linear quantity is applied as an arc on the pinion pitch circle, then it may be equated as an angular rotation of the pinion, and described as the angular error. It may be assumed that as the large gear wheel rotates, the pinions may be exactly in phase regarding their relative angular positions, or they may be out of phase by an amount corresponding to the angular error either positively or negatively. Also it may be assumed that when the pinions are in phase, the average torque is being transmitted by each torsion shaft and when the pinions are the maximum out of phase, the maximum difference in torque transmission exists between the two torque shafts, it being desirable in the example demonstrated to limit this maximum difference to ten percent of the average value. This may be achieved by selecting a torsion shaft length which, when related to the shaft diameter already selected, will provide an angular deflection of the torsion shaft equal to the angular error of the pinion when the shaft is subjected to a torque equal to ten percent of the average torque on the pinion.

Now, if the pinions are in such angular relation to their driving motors that when the pinion to pinion pitch error is at its mean or zero value, the pinion angular error is zero and the torsion shafts are transmitting equal torques, then a positive or negative increase in pitch error will cause one torsion shaft to be deflected more or less than the other by an amount not exceeding the angular error so that the difference in torque does not exceed ten percent of the average torque and, consequently, the power draft on one motor never exceeds that on the other by more than ten percent.

As previously stated, it is necessary to provide a means of ensuring that when both pinions are in firm contact on the driving surfaces of their teeth with the mating surfaces of the teeth of the large gear, the two motor rotors are in correct electrical angular relationship, one to the other.

Therefore, as a further embodiment of my invention, and in order to ensure that the two motor rotors are in the correct electrical angular relationship one to the other, I have provided means for small incremental adjustment in the angular relationship between the pinions and their respective rotors. This incremental adjustment may be achieved by providing adjustment means in all or some of the couplings connecting the various drive elements.

A suitable type of coupling, which is referred to as a differential coupling, consists of two hubs, one mounted on each shaft end, which carry gear teeth. These gear teeth engage in matching female gear teeth cut in the coupling cover, thereby transmitting power from one coupling to the other. Normally, the number of gear teeth on each hub would be the same. However, by manufacturing the two hubs so that one hub has one tooth more than the other, a very large number of alternative assembly possibilities arise so that the two shafts may have an almost infinite number of angular relationships one to the other.

As an alternative to the use of the torsion shafts referred to above, I may incorporate flexible couplings in the drive train to provide resilience. The specific design of the couplings used would, of course, be dependent upon the degree of flexure required.

As yet a still further embodiment of my invention, I have provided an effective means for ensuring a satisfactory angular relationship between the pinions and motor rotors which consists of two simultaneously engaging clutches, one on the output shaft of each motor. These clutches, which may be of a commercially available air operated friction type, are so controlled as to become positively engaged when transmitting substantially the same amount of torque.

BRIEF DESCRIPTION OF DRAWINGS

Embodiments of my invention and their operation will now be described by way of example, in conjunction with the accompanying drawings, wherein:

FIGS. 3, 4 and 5 illustrate schematically various means for simultaneously engaging or releasing the two air clutches.

DESCRIPTION OF SPECIFIC EMBODIMENTS

Figure 1:
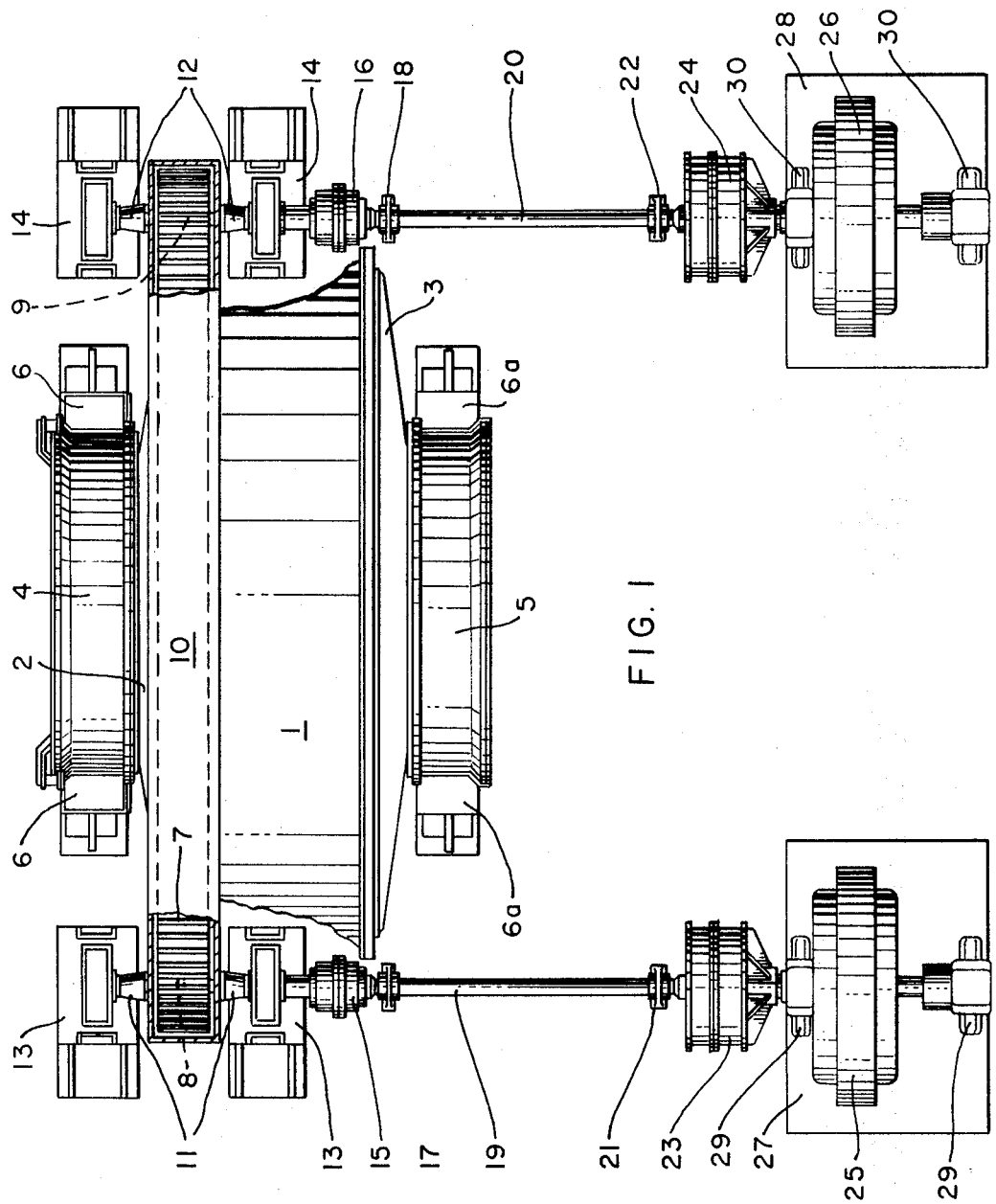
FIG. 1 is a part sectional plan view of a dual pinion drive system in accordance with one embodiment of the invention as applied to a grinding mill.

Referring more particularly to the drawings, a rotatable grinding mill is provided having a cylindrical wall 1 and end walls 2 and 3. Fixedly attached to end wall 2 is the annular flange 4 defining the mill inlet and fixedly attached to end wall 3 of the rotatable grinding mill is the flange 5 defining the mill outlet. The rotatable grinding mill is supported for rotation on bearings 6 and 6a by flanges 4 and 5 which serve as trunnions.

Figure 2:
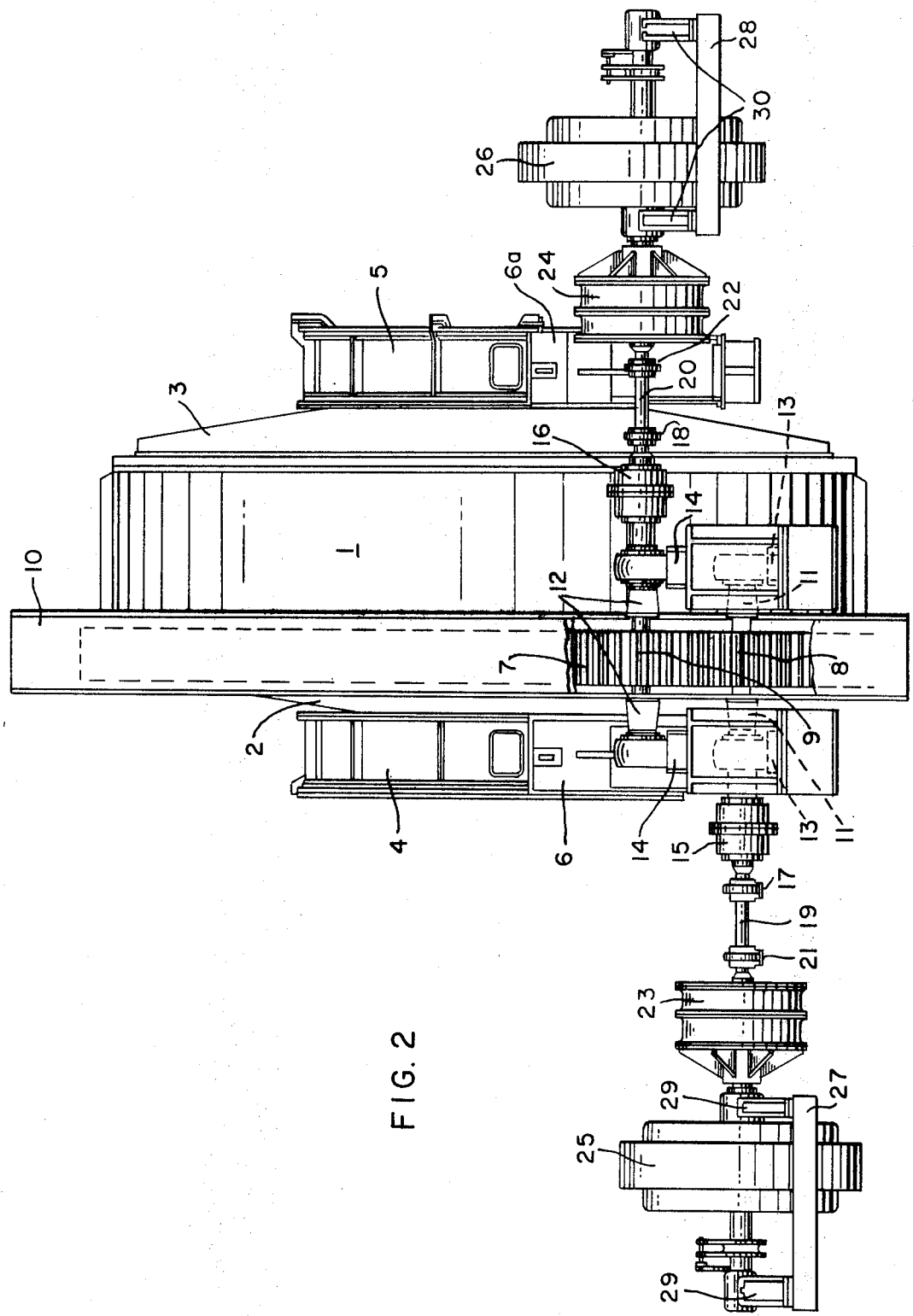
FIG. 2 is a part sectional side elevation of a dual pinion drive system in accordance with a further embodiment of the invention as applied to a grinding mill.

Drive gear 7 is rigidly attached to and co-axial with the outer periphery of cylindrical wall 1, and is adapted to mesh with drive pinions 8 and 9, both the drive gear 7 and drive pinions 8 and 9 being covered by gear housing 10. Pinion shafts 11 and 12, in conjunction with pinion shaft pillow blocks 13 and 14, support the drive pinions 8 and 9 in drive-transmitting relationship with drive gear 7. Drive trains are provided, comprising adjustable couplings 15 and 16, couplings 17 and 18, elastic bodies or torsion shafts 19 and 20, couplings 21 and 22, clutches 23 and 24 and synchronous electrical motors 25 and 26 as illustrated in FIGS. 1 and 2. The drive trains may be located on the same side of the grinding mill, as shown in FIG. 1, or they may be at opposite sides of the grinding mill, as seen in FIG. 2. As will be evident, the pinions may be diametrically opposed, as in FIG. 1, or adjacent one another, as in FIG. 2, the torsion shafts, in the latter case, being shorter. The synchronous electric motors 25 and 26 are located on suitable mounting blocks 27 and 28 and are held in position thereon by motor mounts 29 and 30.

Adjustable couplings 15 and 16 are provided to allow the operator to ensure that the rotors of the two synchronous electric motors 25 and 26 are in correct electrical angular relationship. Each adjustable coupling permits incremental angular adjustment between its respective pinion and motor rotor.

A further means of ensuring a satisfactory angular relationship between the drive pinions and motor rotors consists of the two simultaneously engageable clutches 23 and 24. These clutches are so controlled as to become positively engaged when transmitting substantially the same amount of torque. The means for effecting simultaneous engagement of the clutches may take any one of several forms.

As shown in FIG. 3, there is provided a central air supply source communicating with two, four-way solenoid valves simultaneously, so that air from the common supply source is admitted to or discharged from the clutches 23 and 24. In the conduits connecting the common supply source and each of the solenoid valves are flow control orifices, each of which is adjusted manually to determine the rate of engagement of the clutches, and this engagement is made in such a way that the air flow into the two clutches proceeds at an equal rate, resulting in equal pressure at all times in the two clutches. This in turn results in an equal torque transmission capability from each clutch at any one instant.

Figure 4:
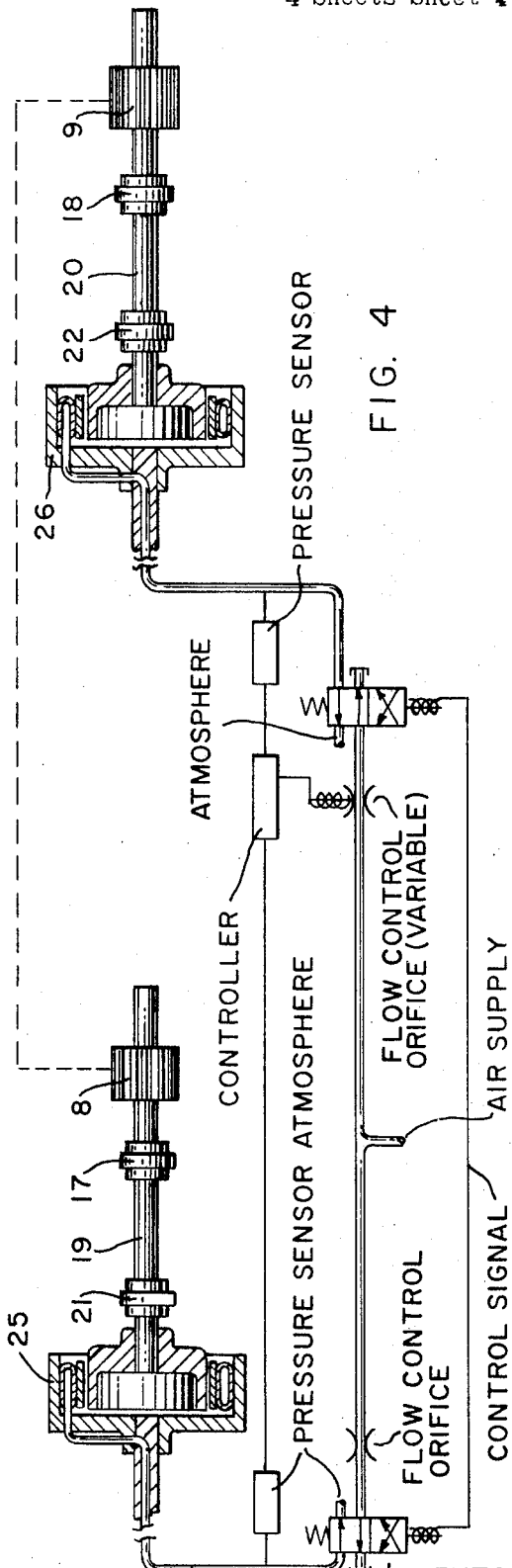

FIG. 4 schematically illustrates a more sophisticated application of the simultaneously engageable clutches illustrated in FIG. 3. In this case, the pressure of the air entering the clutches is measured by means of transducers or pressure sensors, and the signals therefrom compared in a controller which adjusts one of the flow control valves or orifices so as to maintain equal pressure in each line at all times.

Figure 5:
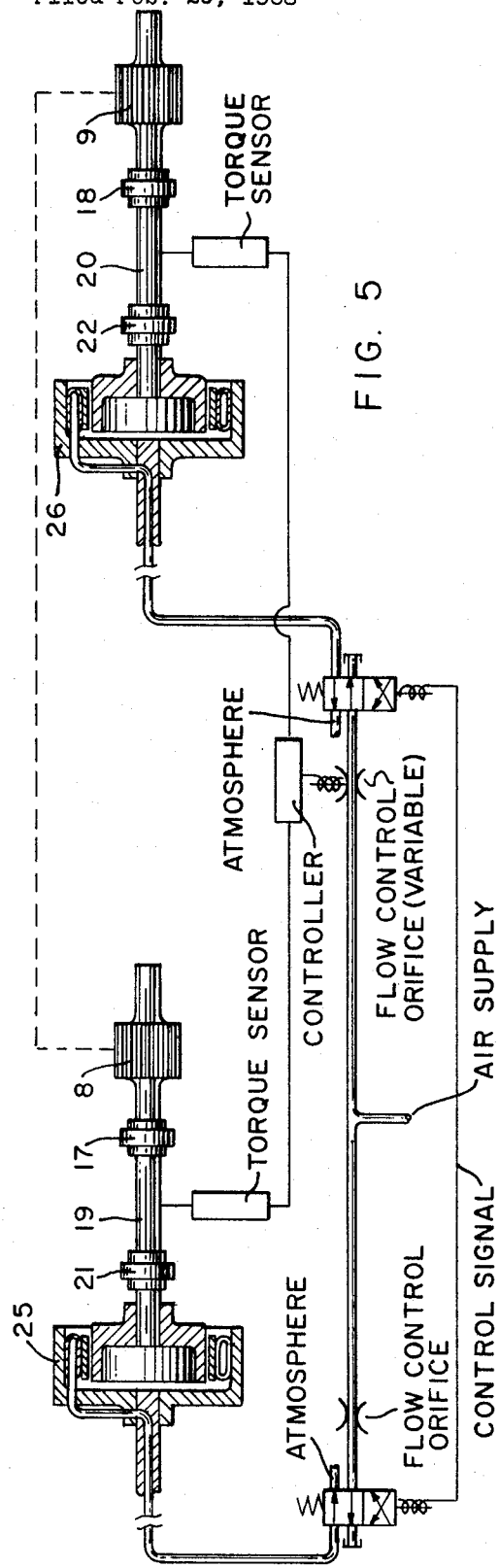

A third alternative is illustrated in FIG. 5, wherein a control circuit which measures the actual transmitted torque by means of suitable torque transducers is provided. The signals from the torque transducers or torque sensors are fed back to the controller for camparison purposes in a similar manner to the pressure signals illustrated in FIG. 4, so that the end result again is an equalizing of pressure in the lines to both clutches. The time for complete engagement of the clutches is in the order of five to ten seconds.

What I claim as my invention is:

1. In a drive system comprising two electrical motors interconnected by means tending to alter the angular relationship of the rotors of said motors during operation, the improvement comprising drive-transmitting elements connected to the output shafts of said motors and having a predetermined degree of elasticity so as to be yieldable in operation to limit fluctuation of power drawn from said motors to a predetermined percentage of the normal power ouput of said motors.

2. In a drive system comprising two electrical motors interconnected by pinions to means tending to alter the angular relationship of the rotors of said motors during operation, the improvement comprising drive-transmitting torsion shafts intermediate the output shafts of said motors and said pinions, said torsion shafts having a predetermined degree of elasticity so as to be yieldable in operation to limit fluctuations of power drawn from said motors to a predetermined percentage of the normal power output of said motors.

3. A drive system as claimed in claim 1, wherein said drive-transmitting elements are torsion shafts.

4. A drive system as claimed in claim 1, wherein said two electrical motors are synchronous electrical motors.

5. A drive system as claimed in claim 2, wherein said means tending to alter the angular relationship of the rotors of said motors is a large diameter gear wheel.

6. A drive system as claimed in claim 5, wherein said large diameter gear wheel is rigidly attached to a rotatable grinding mill.

7. A drive system as claimed in claim 2, wherein said torsion shafts are of a length sufficient to provide a predetermined torsional deflection under the application of a known torsional moment.

8. A drive system as claimed in claim 1 wherein said drive-transmitting elements are flexible coupling means intermediate said motors and said pinions.

9. A drive system as claimed in claim 1, including adjustment means for altering the angular relationships between said pinions and the rotors of said motors.

10. A drive system as claimed in claim 1, which includes two simultaneously engageable clutches operatively associated with said motors.

References Cited

UNITED STATES PATENTS

| | | | |
|---|---|---|---|
| 2,518,781 | 8/1950 | Hindmarch | 74—661 |
| 2,931,241 | 4/1960 | Scott | 74—410 |
| 3,167,967 | 2/1965 | Silberger | 74—411 |
| 3,418,865 | 12/1968 | Baldur | 74—410 |

DAVID X. SLINEY, Primary Examiner

U.S. Cl. X.R.

310—83, 112; 74—410